(12) United States Patent
Kushita (10) Patent No.: US 8,255,621 B2
(45) Date of Patent: Aug. 28, 2012

(54) MULTIPROCESSOR SYSTEM AND PORTABLE TERMINAL USING THE SAME

(75) Inventor: Masayuki Kushita, Tokyo (JP)

(73) Assignee: NEC Corporation, Tokyo (JP)

( * ) Notice: Subject to any disclaimer, the term of this patent is extended or adjusted under 35 U.S.C. 154(b) by 493 days.

(21) Appl. No.: 12/306,200

(22) PCT Filed: Jun. 21, 2007

(86) PCT No.: PCT/JP2007/062495
§ 371 (c)(1),
(2), (4) Date: Dec. 22, 2008

(87) PCT Pub. No.: WO2008/001671
PCT Pub. Date: Jan. 3, 2008

(65) Prior Publication Data
US 2009/0204751 A1    Aug. 13, 2009

(30) Foreign Application Priority Data
Jun. 27, 2006  (JP) ................................. 2006-176430

(51) Int. Cl.
*G06F 12/00*    (2006.01)
(52) U.S. Cl. ........................................ 711/104; 709/213
(58) Field of Classification Search .................. 711/104; 709/213
See application file for complete search history.

(56) References Cited

U.S. PATENT DOCUMENTS

| | | | |
|---|---|---|---|
| 7,380,085 B2 * | 5/2008 | Matter et al. .................. | 711/170 |
| 2003/0009656 A1 * | 1/2003 | Yamamura ........................ | 713/1 |
| 2003/0135771 A1 * | 7/2003 | Cupps et al. ................... | 713/320 |
| 2003/0154471 A1 * | 8/2003 | Teachman et al. ............ | 717/171 |
| 2006/0053246 A1 * | 3/2006 | Lee ............................... | 711/100 |

FOREIGN PATENT DOCUMENTS

| | | |
|---|---|---|
| JP | 1991105424 A | 5/1991 |
| JP | 1992104358 A | 4/1992 |
| JP | 1993242057 A | 9/1993 |
| JP | 1995036704 A | 2/1995 |
| JP | 1999045209 A | 2/1999 |
| JP | 1999184831 A | 7/1999 |
| JP | 2002007158 A | 1/2002 |

OTHER PUBLICATIONS

International Search Report for PCT/JP2007/062495 mailed Aug. 7, 2007.
Supplementary European Search Report for EP 07 76 7322 completed Jul. 10, 2009.

* cited by examiner

*Primary Examiner* — Hashem Farrokh (57) ABSTRACT

[PROBLEMS] To provide a portable terminal designated for speeding up the startup time of a multiprocessor system which is configured to be started up by a program being transferred from a specific processor to another processor. [MEANS OF SOLVING PROBLEMS] As a storing pattern of a program to a memory (ROM) transferred to another processor, a header is given to each code section. The header stores information as to whether or not the section needs to be transferred in each startup mode and size information of the corresponding code section. The startup time for each mode is shortened by enabling to transfer only the necessary portion from the transfer source processor to the transfer destination processor for each startup mode.

3 Claims, 9 Drawing Sheets

MULTIPROCESSOR SYSTEM AND PORTABLE TERMINAL USING THE SAME

INCORPORATION BY REFERENCE

This application is the National Phase of PCT/JP2007/062495, filed Jun. 21, 2007, which claims priority to Japanese Patent Application No. 2006-176430, filed on Jun. 27, 2006.

TECHNICAL FIELD

The present invention relates to a portable terminal equipped with a multiprocessor, and in particular, to shortening startup time in a multiprocessor system which is configured to be started up by a program being transferred from a specific processor to another processor.

BACKGROUND ART

It is considered that portable terminals such as a portable telephone, a portable information terminal, and the like will be realized with a multiprocessor system using a plurality of processors in many cases, along with requirements for expanding service functions and speeding up.

It is possible with a multiprocessor system configured to be started up by a program being transferred from a specific processor to another processor to reduce the number of memory chips, by integrating memories to be stored including a program for another processor. This is advantageous for miniaturizing the system (Patent Document 1).

DISCLOSURE OF THE INVENTION

Problems to be Solved by the Invention

However, in such a system, a program is required to be transferred from a specific processor to another processor on startup. Due to this, processing time for the transfer is increased additionally and it adversely affects on the system startup time. As a method for improving this disadvantageous point, it is considered to compress and store the program to be transferred in advance and then transfer the compressed program. In this manner, the transferring time can be reduced, and the startup time is shortened thereby. By storing the compressed program, it is possible to cut down necessary memory size and memory cost.

However, even with a multiprocessor system that uses a compressed program for transfer, reduction in the additionally increased startup time is restricted because whole content of the program is transferred.

As a traditional technique relating to a multisystem, Patent Document 2 is also known in addition to Patent Document 1.
Patent Document 1: Japanese Patent Application Laid-open No. 5-242057
Patent Document 2: Japanese Patent Application Laid-open No. 11-184831

The inventor of the present invention focused his attention on a fact that it is not necessarily required to transfer a whole program from a specific processor to another processor in a multiprocessor system upon startup, whereby he has invented the present invention.

An object of the present invention is to provide a multiprocessor system, a transferring method, and a portable terminal that are capable of shortening startup time depending on a startup mode.

Means for Solving the Problems

According to the present invention, there is provided a multiprocessor system including at least a first processor and a second processor, and the multiprocessor system includes: a read-only memory for storing a first program executed by the first processor and a second program executed by the second processor; and a random access memory in which the second program is expanded and stored, wherein, when starting up the multiprocessor system, the first processor selects, in accordance with a designated startup mode, a necessary portion of the second program which relates to the startup mode and expands it into the random access.

The read-only memory stores: a divided portion into which the second program is divided; and a header which stores information size for each divided portion, and information for each divided portion and a startup mode.

It is desirable that the divided portion of the program is compressed and/or encoded to be stored.

According to one exemplary embodiment of the present invention, the multiprocessor system includes a random access memory for the first processor to be accessed by the first processor. Further, the random access memory in which the second program is expanded and stored is a random access memory for the second processor accessed by the second processor.

According to another exemplary embodiment of the present invention, the random access memory is connected so that it can be accessed by the first processor and the second processor; and includes: a memory area used by the first processor, a memory area used by the second processor, and a memory area shared by the first processor and the second processor.

In the exemplary embodiment, after expansion into the memory area used by the second processor has been completed, the second processor is maintained in a reset state until validity of the expanded program is confirmed.

Further, as a feature of the exemplary embodiment, after an expansion into the memory area used by the second processor has been completed or validity of the expanded program has been confirmed, it is possible to set the first processor to be prohibited from accessing the memory area used by the second processor.

According to the present invention, a portable terminal using the multiprocessor system described above can also be obtained.

Further according to the present invention, a transferring method in a multiprocessor system including: a first processor, a second processor, a read-only memory for storing a first program executed by the first processor and a second program executed by the second processor, and a random access memory in which the second program is expanded and stored, wherein, when starting up the multiprocessor system, the first processor selects, in accordance with a designated startup mode, a necessary portion of the second program that relates to the startup mode and transfers it to the random access memory can be obtained.

The first processor executes the steps of: prior to the transfer, determining validity of a boot loader for the second processor and transferring the boot loader; setting the second processor to a code download mode and reset-starting the second processor; judging a startup mode and transferring a portion of the second program corresponding thereto; confirming validity of the transferred portion of program by inquiring the second processor; and after the confirmation, setting the second processor to a normal operation mode and reset-starting it.

According to one exemplary embodiment of the present invention, the multiprocessor system includes a random access memory to be used for the first processor, accessed by the first processor. Further, the random access memory in which the second program is expanded and stored is a random access memory for the second processor, accessed by the second processor.

According to another exemplary embodiment, the random access memory is connected so that it can be accessed by the first processor and the second processor, and the random access memory includes: a memory area used by the first processor, a memory area used by the second processor, and a memory area shared by the first processor and the second processor.

Further, in one exemplary embodiment, the transferring method in the multiprocessor of the present invention includes the steps of: judging the startup mode; in accordance with the startup mode, expanding a portion of the second program which corresponds to the startup mode into a memory area used by the second processor; checking validity of the expanded portion of the program; setting an access guard to the memory area used by the second processor so as not to be accessed from the first processor; and releasing the second processor from a reset state so as to allow the second processor to operate normally and start up with the mode.

Furthermore, according to the present invention, a program used for a multiprocessor system including a first processor, a second processor, a read-only memory for storing a first program executed by the first processor and a second program executed by the second processor, and a random access memory in which the second program is expanded and stored, wherein, when starting up the multiprocessor system, the program includes the step of: causing the first processor to select, in accordance with a designated startup mode, a necessary portion of the second program that relates to the startup mode and transferring it to the random access memory can be obtained.

According to one exemplary embodiment, the program includes the steps of: prior to the transfer, causing the first processor to determine validity of a boot loader and transferring the boot loader; setting the second processor to a code download mode and reset-starting the second processor; judging a startup mode and transferring a portion of the second program corresponding thereto; confirming validity of the transferred portion of program by inquiring the second processor; and after the confirmation, setting the second processor to a normal operation mode and reset-starting it.

According to one of the exemplary embodiments, the random access memory is connected so that it can be accessed by the first processor and the second processor, and includes a memory area used by the first processor, a memory area used by the second processor, and a memory area shared by the first and the second processors.

A program according to this exemplary embodiment includes the steps of: judging the startup mode; in accordance with the startup mode, expanding a portion of the second program into the memory area used by the second processor corresponding to the startup mode; checking validity of the expanded program; setting an access guard to the memory area used by the second processor so as not to be accessed from the first processor; and releasing the second processor from a reset state so as to allow the second processor to operate normally and start up with the mode.

Advantageous Effect of the Invention

According to the present invention, startup time with each mode can be shortened.

BEST MODE FOR CARRYING OUT THE INVENTION

Hereinafter, exemplary embodiments of the present invention will be explained with reference to the drawings.

Exemplary Embodiment 1

Figure 1:
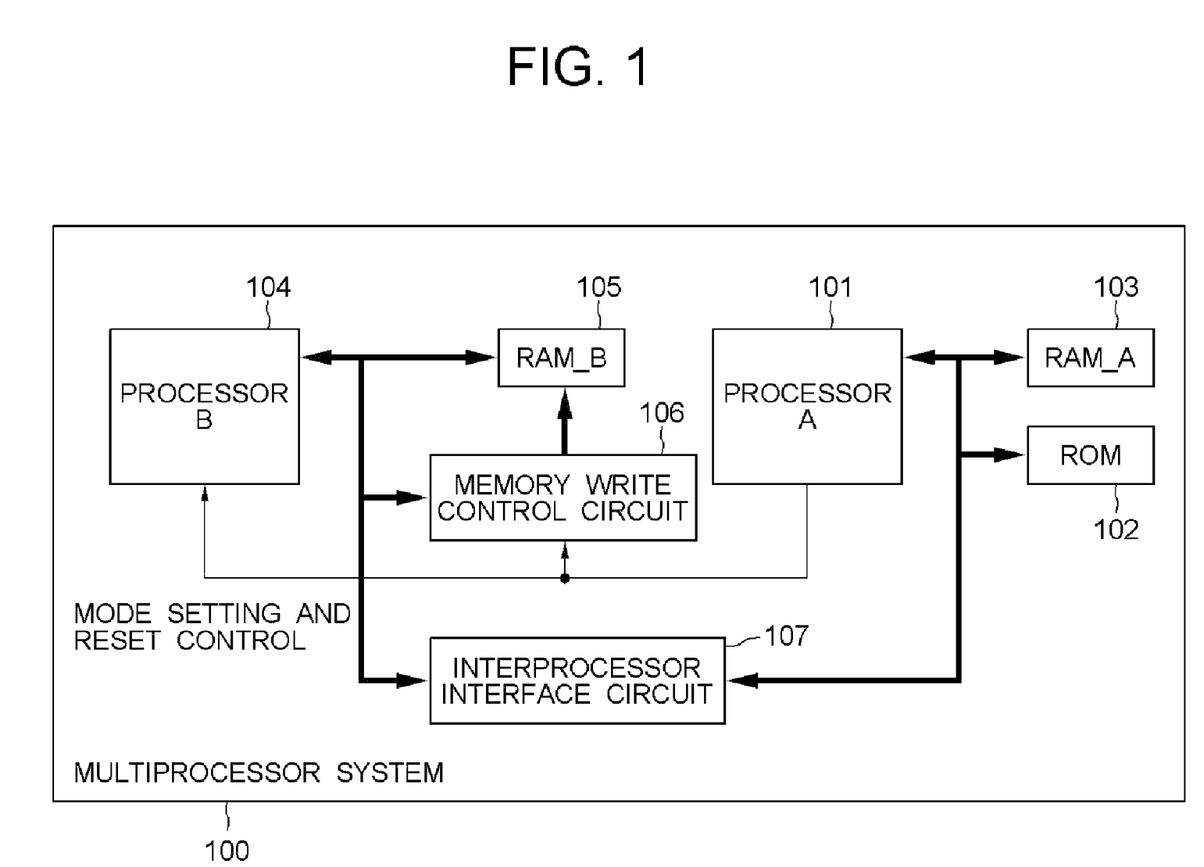
FIG. 1 is a block diagram showing a multiprocessor system according to a first exemplary embodiment of the invention.

FIG. 1 is a block diagram showing a multiprocessor system 100 as a first exemplary embodiment of the present invention. In FIG. 1, the multiprocessor system has a system structure in which a program is transferred from a processor A (a transfer source processor) 101 to a processor B (a transfer destination processor) 104.

In FIG. 1, the system 100 includes the processor A 101, a ROM (a read-only memory) 102 and a RAM (a random access memory)_A 103 which are connected to the processor A 101 through a bus line. The system further includes a RAM_B 105 attached to the processor B 104. The system includes an interprocessor interface circuit 107 as an interface between the processor A 101 and the processor B 104, and a memory write control circuit 106 for writing a program, which is transferred from the processor A through the interprocessor interface circuit under control of the processor A, to the RAM_B 105.

The program for the processor A 101 and the program for the processor B 104 are both stored in the ROM 102. The number of the ROM 102 does not need to be one physically as long as it is connected to a memory bus of the processor A 101 and the program for the processor B 104 is stored together therein. The RAM_A 103 is a working memory of the processor A 101, and is often connected to a high-speed memory bus which is different from a memory bus the ROM 102 is connected to. The RAM_B 105 is used as an area where a program for the processor B 104 is expanded and is also used as a working memory of the processor B 104.

The interprocessor interface circuit 107 is for performing data communication between the processors 101 and 104. Upon startup, transferred data (a code of boot loader) from the processor A 101 is transferred to the memory write control circuit 106 in accordance with signal control of the processor A 101. The memory write control circuit 106 writes the transferred data to the RAM_B 105.

While the data is transferred, the processor B 104 is maintained in a reset state in accordance with the signal control of the processor A 101. After the transfer of the code of the boot loader has been completed, the processor B 104 starts executing the boot loader written in the RAM_B 105 in accordance with the control of the processor A 101. The reception of program for the processor B 104 transferred from the processor A 101 and expansion processing of the same into the RAM_B 105 hereafter are performed based on the boot loader.

The program for the processor B 104 may be transferred from the processor A 101 in a form of being compressed and encoded. In such a case, decoding processing is performed to the compressed and encoded program within the boot loader before it is expanded into a prescribed program area of the RAM_B 105. When the transfer of the program itself for the processor B 104 is completed, the processor B 104 starts executing the program written in the RAM_B 105 in accordance with the control of the processor A 101.

Figure 2:
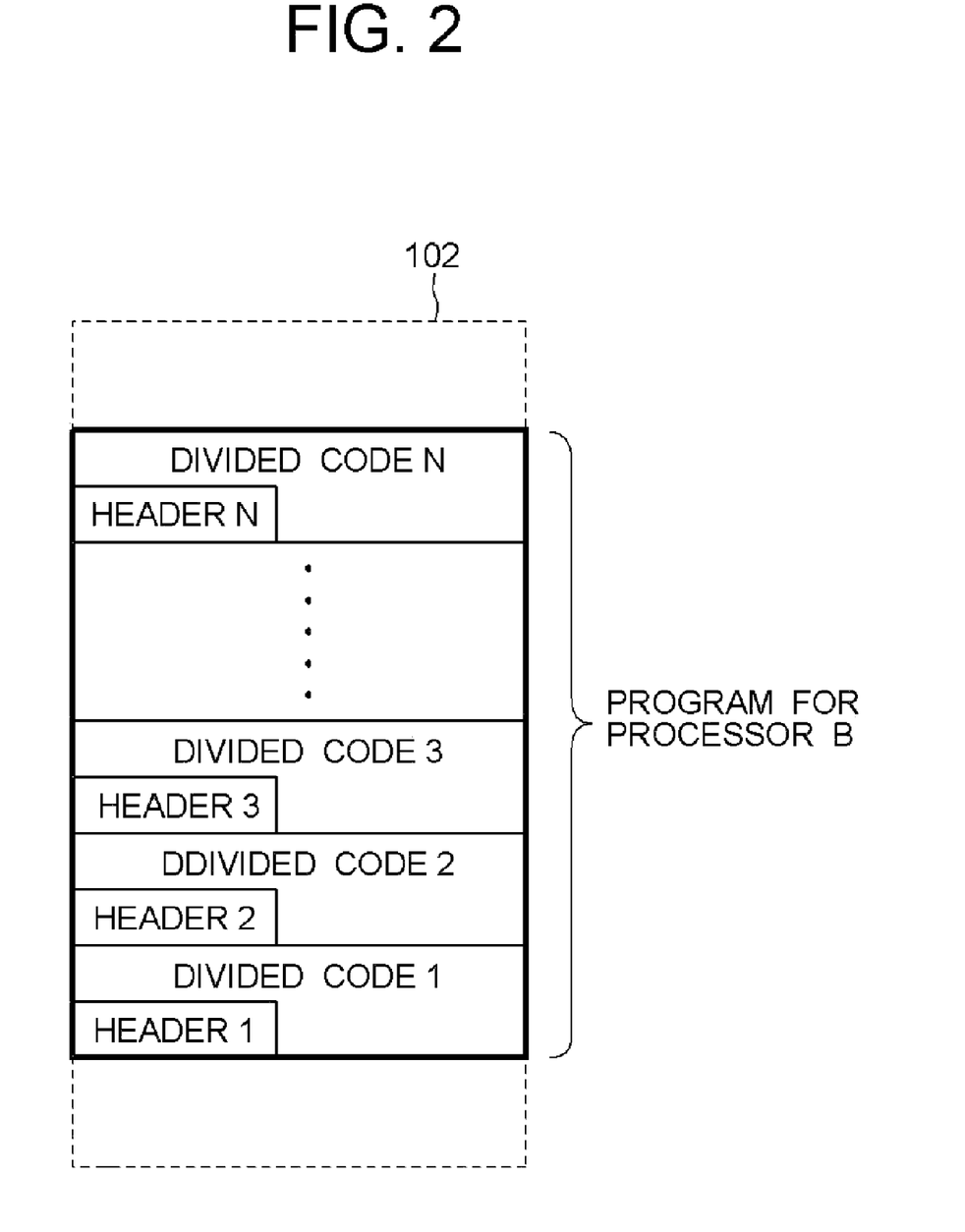
FIG. 2 is a diagram showing a storage state of a program for a processor B in a ROM 102 used in the first exemplary embodiment.

FIG. 2 illustrates a pattern in which the program for the processor B 104 is divided and stored in a certain area within the ROM 102. Each divided portion has a header thereinside in addition to a divided code of the program. Each header stores size information of the corresponding divided portion and information indicating whether or not the divided portion needs to be transferred for each startup mode. In addition, it is possible to store the program in the ROM 102 by performing compression and/or encoding for each divided portion as long as the header portions are in the form the processor A 101 can directly read and interpret. Also, the header portions are not subject to be transferred to the processor B 104. FIG. 2 shows a state where each divided portion is physically successive.

The divided code may be treated as a file for each divided portion through a file system. Each divided portion does not necessarily need to be physically successive.

Figure 3:
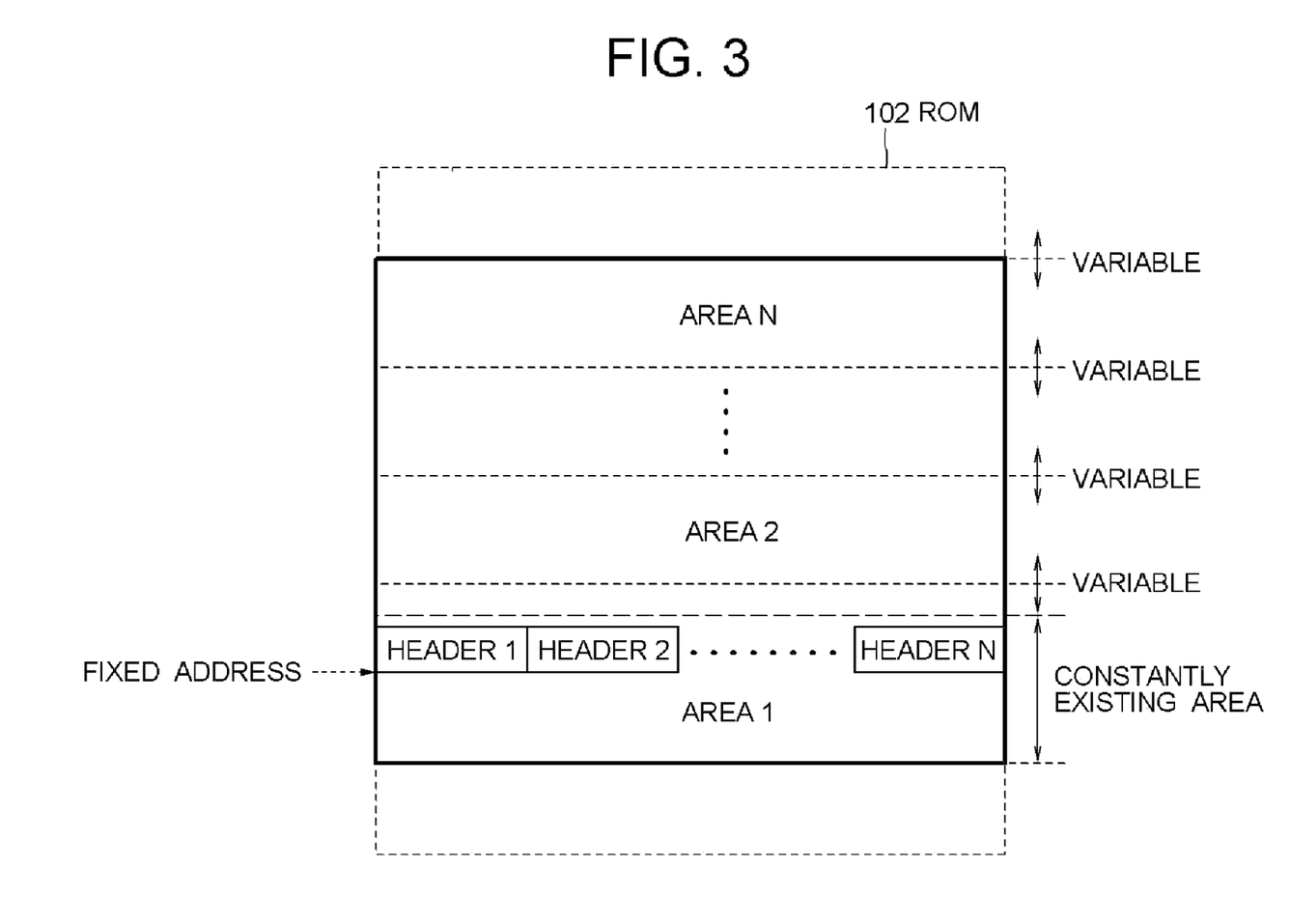
FIG. 3 is a diagram showing another storage state of the program for the processor B in the ROM 102 used in the first exemplary embodiment.

FIG. 3 illustrates a storing pattern, as well as FIG. 2, in which the program for the processor B 104 is sectioned to be stored in a certain area within the ROM 102. In this regard, in FIG. 3, although each sectioned area is physically successive, borders between each area are assumed to be variable. In this storing pattern, the portion of the program which does not need to be transferred depending on a startup mode, is arranged backward (upper part in the drawing), and the necessary portion of the program, which are successively arranged from the leading part, can be transferred using a DMA (direct memory access) method. Headers having the same information as of FIG. 2 are stored all together in a fixed address within the area that constantly exists (an area that needs to be transferred at any startup mode) so as to be corresponding to each sectioned area. By storing the headers in the fixed address, the headers are formed in such a manner that the processor A 101 can directly read and interpret. When the successive areas are transferred by using the DMA method, the header portion is subject to be transferred. Additionally, by arranging the header portion at the leading part of the program area for the processor B 104, such a structure becomes also possible that the program body portion other than the header portion is compressed and/or encoded for each area and stored. In such a case, the header portion is not subject to be transferred. Further, the size information stored in the header indicates the size of each area after the compression and/or encoding. In addition, although not illustrated in FIGS. 2 and 3, the boot loader for the processor B 104 is stored within the ROM 102 separately.

Next, operation to transfer a program from the processor A 101 to the processor B 104 will be explained using the sequence chart in FIG. 4 and the flowchart in FIG. 5.

Figure 4:
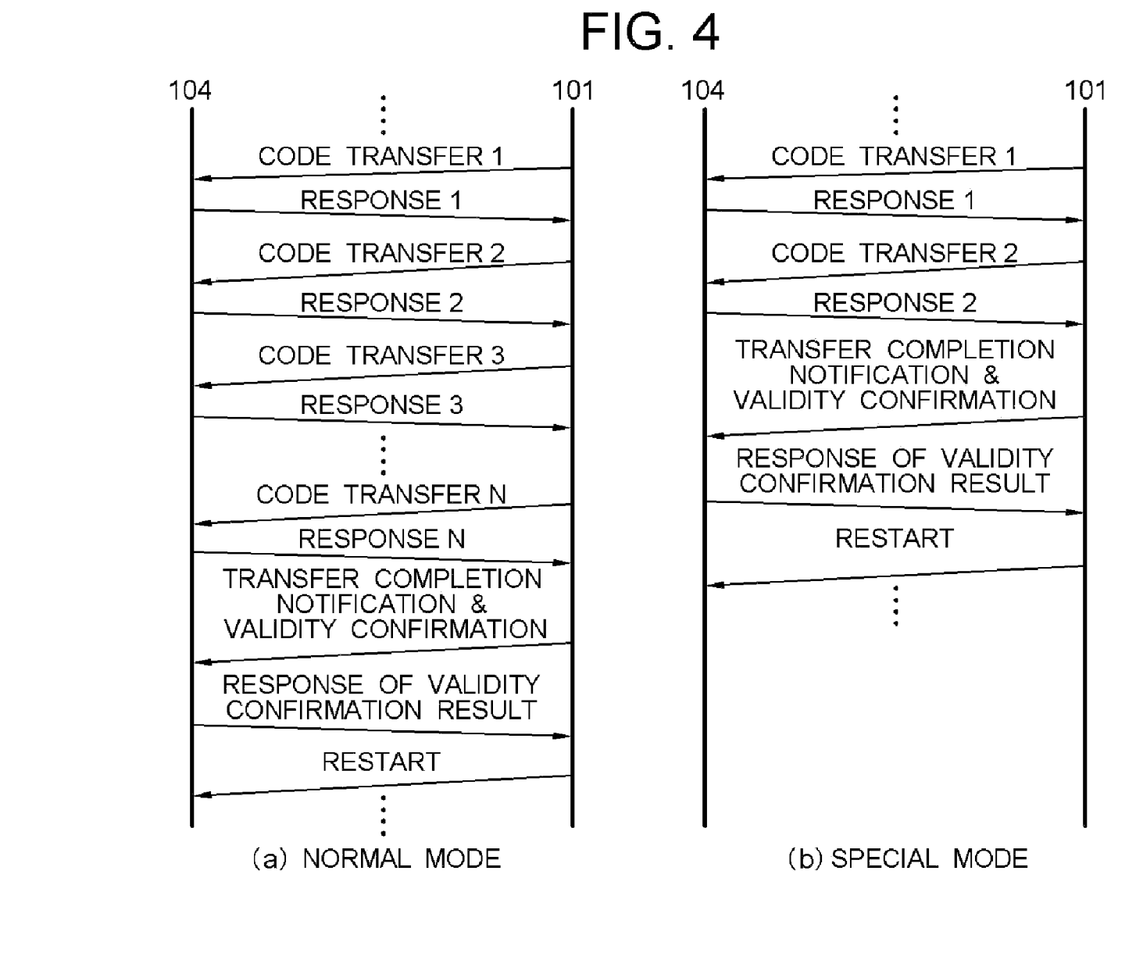
FIG. 4 is a sequence diagram showing a sequence between a processor A and the processor B in the first exemplary embodiment.

FIG. 4 is a sequence chart showing procedures for transferring the program for the processor B 104 stored in the ROM 102 from the processor A 101 to the processor B 104 as in FIG. 2 for example, in which FIG. 4A shows a normal mode and FIG. 4B shows a special mode, respectively. Here, the normal mode indicates a mode with which full function included in the entire program code is usable, and the special mode indicates a mode with which a part of the function is usable or a part of the function is limited to be unusable. In this exemplary embodiment, it is assumed that when the startup mode is the normal one, i.e., normal mode startup, all of each divided code needs to be transferred. It is also assumed that when the startup mode is the special one, i.e., special mode startup, only divided codes 1 and 2 need to be transferred.

In the sequence shown in FIG. 4, for transferring the divided codes, the processor A 101 accesses the program for the processor B 104 stored in the ROM 102 and then judges for each divided code as to whether or not it needs to be transferred to the processor B 104. Prior to that, the processor A 101 judges if starting up with the normal mode has been instructed or starting up with the special mode has been instructed.

In the case that startup with the normal mode has been instructed, all of the divided codes of the program for the processor B 104 are transferred as shown in FIG. 4A. In this case, since it is not a special mode, transfer of each divided code to the processor B and reception of a response from the processor B for each divided code are performed referring to the headers for all of the divided codes, and transfer of the next divided code and reception of a response thereof are performed. In such a manner, all of the divided codes, from the divided code 1 to the divided code N, are transferred.

In the case of the startup with the special mode, each header of the divided codes is checked and judged whether or not the header indicates the necessity of the transfer of the divided code at the startup with the special mode, and only the divided codes that need to be transferred are transferred to the processor B. With a response from the processor B that the transfer is received, the same judgment will be made for the next divided code. The divided code that needs to be transferred will be transferred and a response from the processor B will be received. FIG. 4B is a sequence where only the divided codes 1 and 2 need to be transferred.

Referring continuously to FIGS. 4A and 4B, when completing the transfer of the necessary divided codes and confirming the response from the processor B 104, the processor A 101 sends, in both cases, normal and special modes, a transfer completion notification and a validity confirmation request. Upon receiving them, the processor B 104 performs validity check (checksum confirmation, alteration detection, and the like) of the program expanded in the RAM_B 105, and sends back results to the processor A 101. If there is no problem with the results of the received validity check, the processor A 101 controls the processor B 104 so that the processor B 104 starts executing the program expanded in the RAM_B 105. Namely, the operation of the processor B 104 is divided into phases: to receive a program code sent from the processor A 101 and expand it into the RAM_B 105; and to execute the program which is expanded in the RAM_B 105. The latter phase is started by a restart after completing the former phase.

Figure 5:
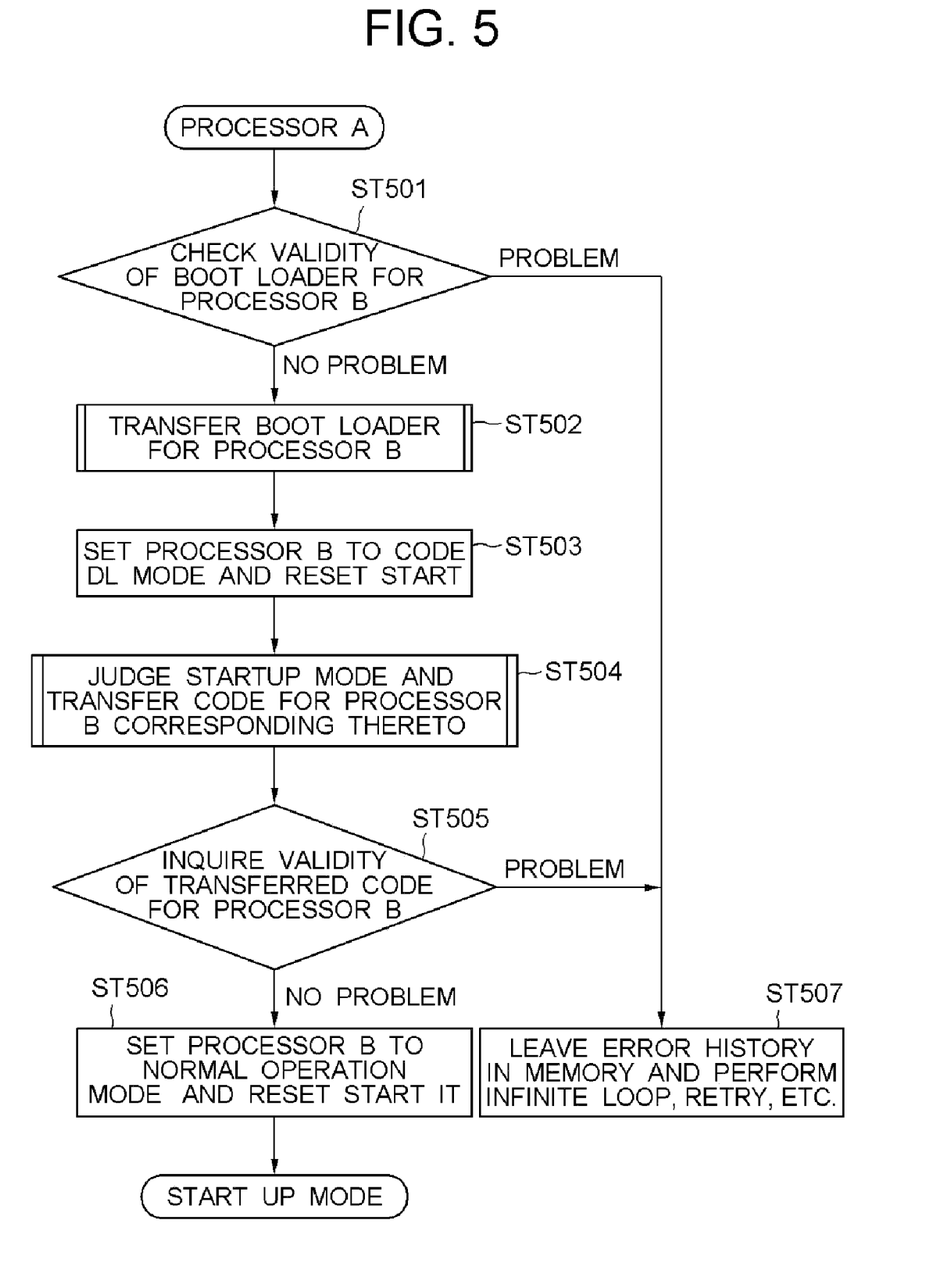
FIG. 5 is a diagram showing a processing flow of the processor A 101 upon transferring a program from the processor A 101 to the processor B 104 in the first exemplary embodiment.

FIG. 5 shows one example of a processing flow within the processor A 101 when transferring a program from the processor A 101 to the processor B 104. First, validity check (such as alteration detection) of the boot loader is performed (ST501) because the boot loader for the processor B 104 possibly includes important processing such as code-breaking or the like. If there is no problem, the boot loader is transferred to the processor B 104 (ST502). Specifically, this transfer is performed in such a manner that the processor A 101 sends the boot loader to the interprocessor interface circuit and the memory write control circuit writes it in the RAM_B 105.

Next, for executing the boot loader, the processor B 104 is set to a program download mode by signal line control through a line for mode setting and reset control shown in the drawing, and reset-started (released from a reset state) (ST503). When the boot loader for the processor B 104 is started up (not illustrated), the processor A 101 transfers to the processor B 104 only the necessary portion of the program for the startup in accordance with either one of the normal mode startup or special mode startup (ST504). When the transfer is completed, the processor A 101 inquires about the validity (checksum confirmation, alteration detection, etc.) of the program which is expanded into the RAM_B 105 by the processor B 104 (ST505). If there is no problem, the processor B 104 is set to a normal operation mode by the signal line control so as to execute the transferred program, and is reset-started, i.e., reset and started up (restarted with the normal operation mode) (ST506). The normal operation mode herein indicates a hardware operation mode of the processor B including the memory write control circuit, which follows the download mode. This is different from the normal mode or the special mode described previously as an operation mode of the entire system. If there is a problem in the validity check of the boot loader or the result of validity inquiry of the program expanded in the RAM_B 105, the processor A 101 leaves an error history in a memory (a nonvolatile memory such as a flash memory, which may be shared as the ROM 102), and processed in an infinite loop, or tries the procedure again from the beginning (ST507).

As described above, according to the exemplary embodiment of the present invention, as a storing pattern of the program in a memory (ROM) that is to be transferred to another processor, a header is given to each certain code section; and inside the header, size information of the corresponding code section and information as to whether or not the section needs to be transferred corresponding to each startup mode are stored. By having such a storing pattern in the memory and enabling to transfer only the necessary portion corresponding to each startup mode, startup time for each mode can be shortened.

Further, by making the headers to be in a form (a storing pattern) such that the transfer source processor can directly read and interpret, the transfer source processor can determine a startup mode and transfer to the transfer destination processor only the minimum portion of the program necessary for the startup mode, so that the transfer destination processor can start up with the mode. This makes it possible to minimize the influences caused by interprocessor program transfer processing and shorten startup time in accordance with its objects, with respect to startup for each mode, i.e., a mode used at hospitals and the like where wireless communication is prohibited, a single communication mode used with a mode corresponding to a multi communication system such as W-CDMA, GSM, and W-LAN, and a trial mode targeted only at checking hardware in a production process, and the like. This leads to improvement of merchantability and productivity.

If such a multiprocessor system is applied to a portable telephone in which a specific area mode, such as use in hospitals or the like where wireless communication is prohibited, is provided as a special mode in addition to a normal mode used normally, the startup time in the special mode can be shortened. Similarly, if the multiprocessor system according to the present invention is applied to a portable telephone in which a single communication mode is provided as a special mode in addition to a normal mode which corresponds to a multi communication system such as W-CDMA, GSM, and W-LAN, used normally, the startup time of the special mode can be shortened. Further similarly, if the system according to the present invention is applied to a portable telephone in which a trial mode targeted only at checking hardware in a production process is provided as a special mode, the startup time in the trial mode can be shortened.

Such special modes are not limited to one type, a plurality of them may be provided. That is, a specific area mode, a single communication mode, a trial mode, and the like can be combined into one portable telephone. These special modes can be selected and started up in accordance with the environment the portable telephone is used.

Exemplary Embodiment 2

Next, a second exemplary embodiment of the present invention will be explained. The fundamental structure is the same as the aforementioned exemplary embodiment. However, the multiprocessor system of the second exemplary embodiment has a shared RAM.

Figure 6:
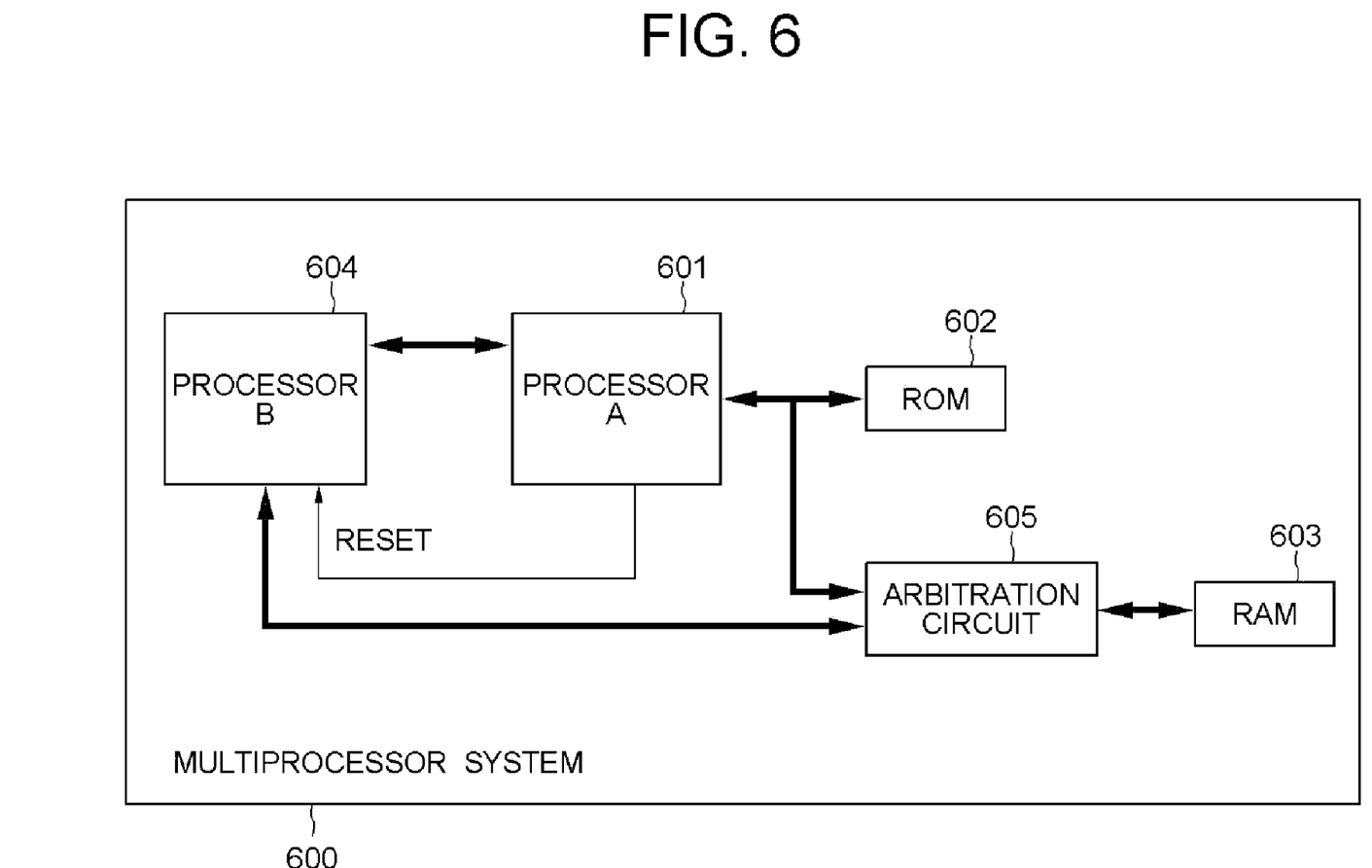
FIG. 6 is a block diagram showing a multiprocessor system according to a second exemplary embodiment of the present invention.

Referring to FIG. 6, a RAM 603 can be accessed by both a processor A (a transfer source processor) 601 and a processor B (a transfer destination processor) 604 in a multiprocessor system 600. Between them, an arbitration circuit 605 which adjusts and gives a bus citizenship is arranged. The RAM 603 is mainly used for the combined application of the RAM_A 103 and RAM_B 105 in FIG. 1. In addition to that, instead of the interprocessor interface circuit 107 in FIG. 1, the RAM 603 includes a shared area which can be accessed by both of the processors and is used for interprocessor communication. That is, referring to FIG. 7, the RAM 603 includes a shared area 72 used by the processors A and B in addition to an area 71 used by the processor A and an area 73 used by the processor B.

Figure 7:
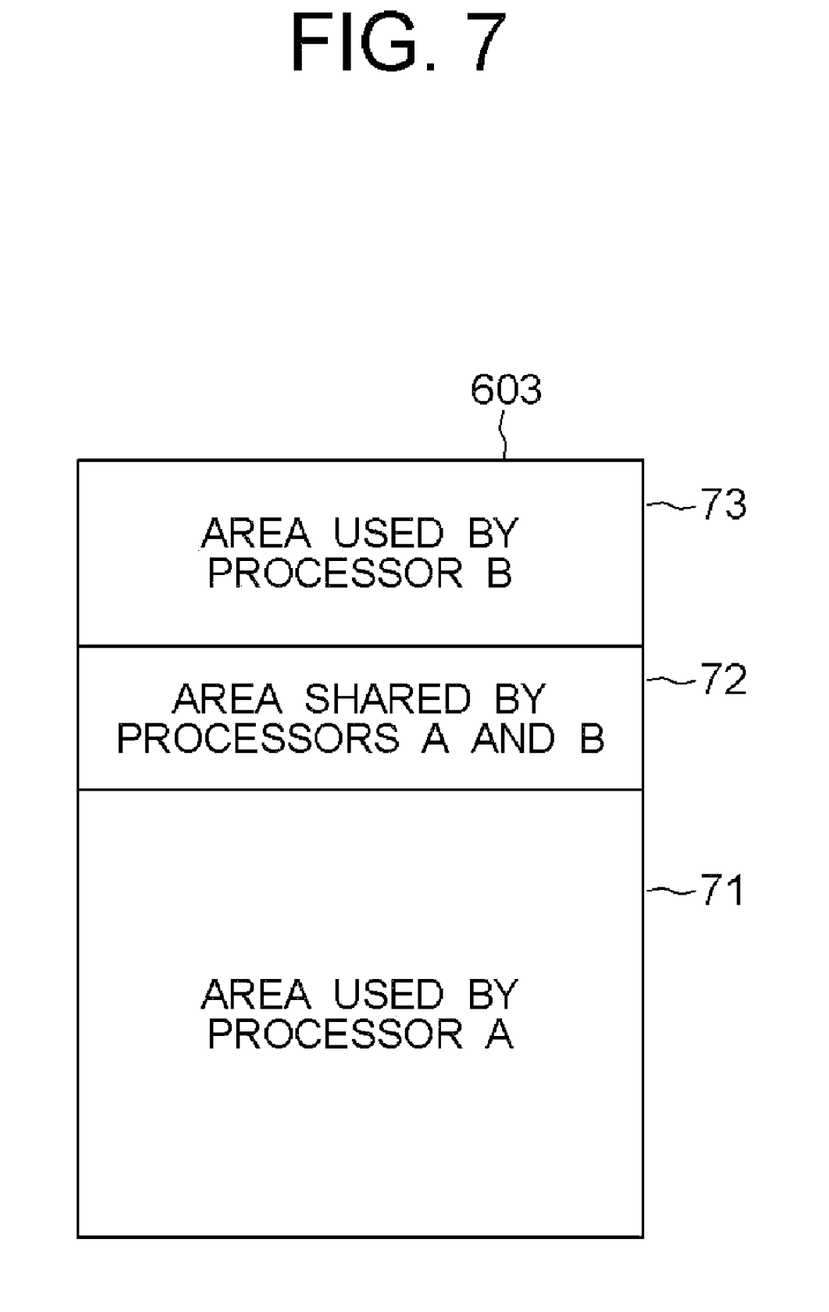
FIG. 7 is a diagram showing a memory area within a RAM 603 used in the second exemplary embodiment.

The ROM 602 is equivalent to the ROM 102 in FIG. 1. However, since the processor A 601 can directly expand the program for the processor B 604 stored in the ROM 602 into the area 73 in the RAM 603 used by the processor B, there is no need to store a boot loader in the ROM 602 for the processor B 604. Until the processor A 601 expands the program for the processor B 604 stored in the ROM 602 into the area 73 in the RAM 603 used by the processor B and completes validity check (checksum confirmation, alteration detection, and the like) of the expanded program, the processor B 604 is maintained in a reset state. After confirming that the program has been expanded without problems, the reset state is released by the control of the processor A 601, and the processor B 604 starts executing the program expanded in the RAM 603.

Figure 8:
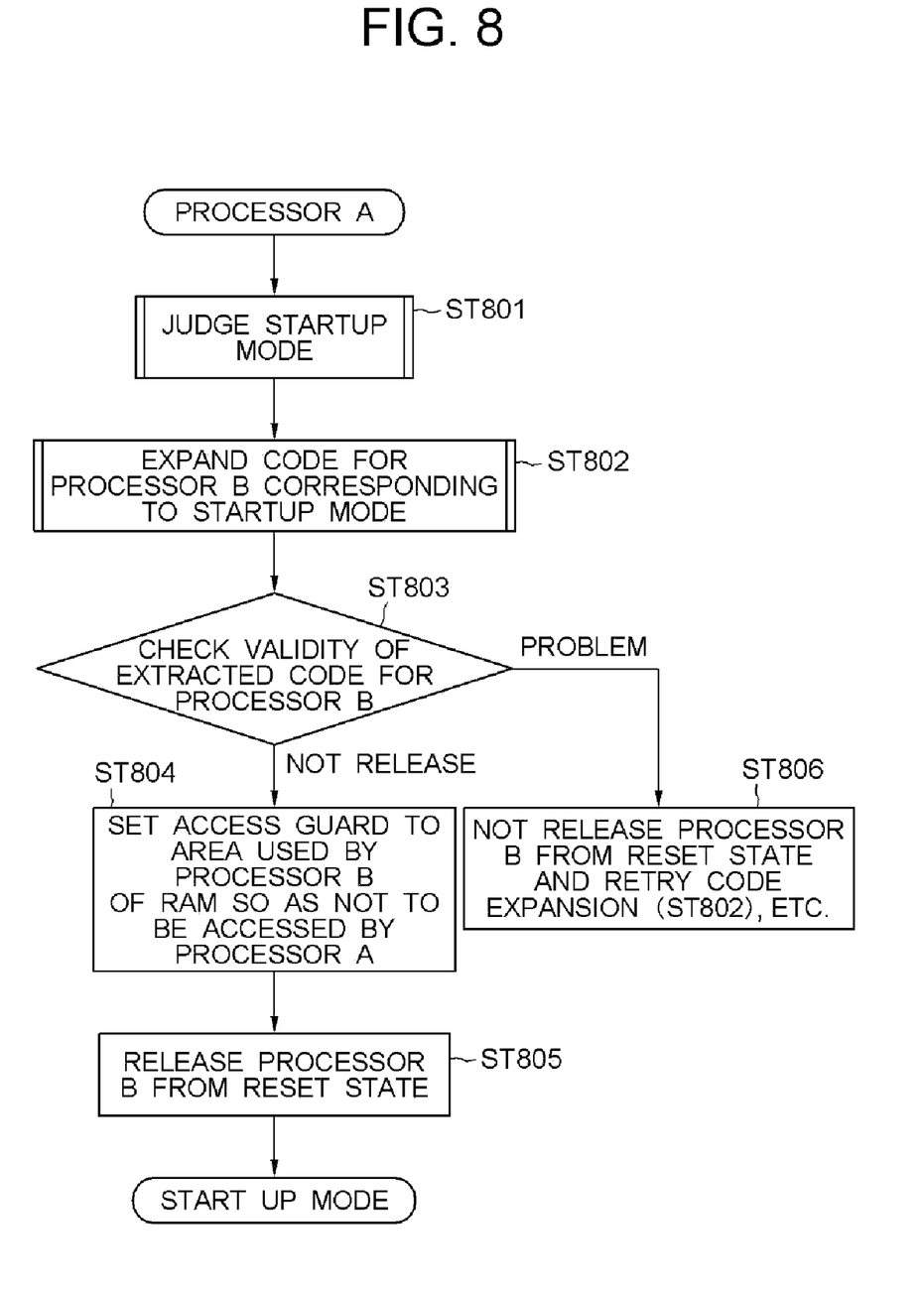
FIG. 8 is a diagram showing one example of processing flows within a processor A 601 upon transferring a program from the processor A 601 to a processor B 604 in the second exemplary embodiment.

FIG. 8 illustrates an example of a processing flow within the processor A 601 in the second exemplary embodiment when transferring a program from the processor A 601 to the processor B 604. First, the processor A 601 judges an instructed startup mode (ST801), and expands only a necessary portion of the program in accordance with the startup mode into the area of the ROM 603 used by the processor B (ST802). By referring to the header of the divided portion of the program for the processor B stored in the ROM 602, the processor A 601 judges whether or not there is a divided code that corresponds to the instructed startup mode. If there is writing in the header that the divided code is necessary for the startup mode, the divided code is expanded into the area of the RAM 603 used by the processor B. Upon this, if the program for the processor B stored in the ROM 602 is compressed and/or encoded, decoding processing thereof is conducted before expanded into the area 73 in the RAM 603 used by the processor B. Next, the processor A 601 performs the validity check (the checksum confirmation, the alteration detection, and the like) of the program for the processor B expanded in the RAM 603 (ST803). If there is no problem there, the processor A 601 performs guard setting that prohibits access from the processor A to the area of the RAM 603 used by the processor B (ST804). The processor A 601 then releases the processor B from the reset state and allows the processor B to start executing the program expanded in the RAM 603 (ST805). If there is a problem with the result of the validity check of the program expanded in the RAM 603, the processor A 601 leaves an error history in a memory (a nonvolatile memory such as a flash memory and the like, which may be shared as the ROM 602), and deals with the problem, for example, by performing a retry of procedures after the program expansion processing of ST802 without releasing the processor B from the reset state (ST806).

Next, a portable telephone to which the multiprocessor system according to the present invention is applied will be explained.

Figure 9:
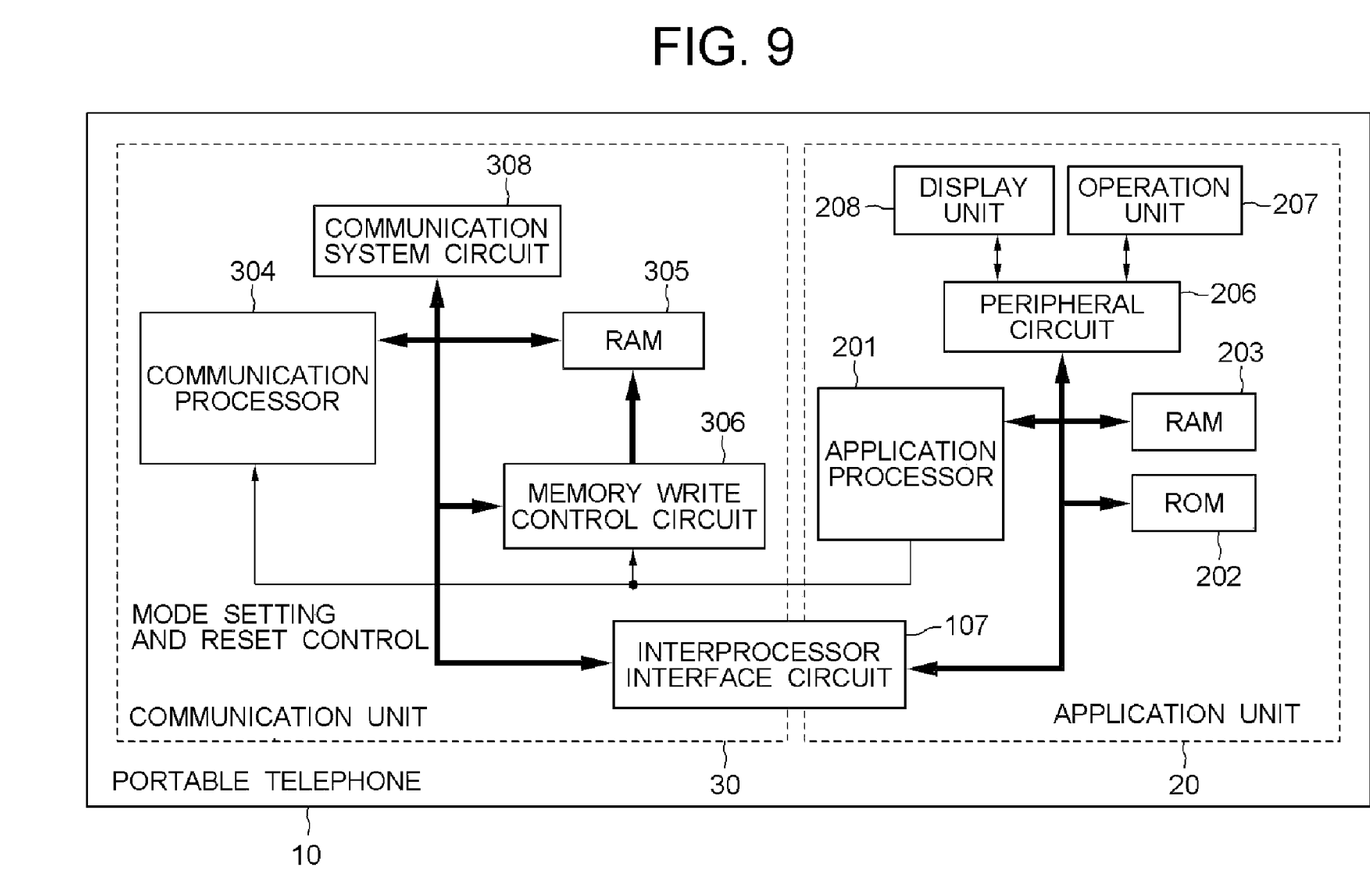
FIG. 9 is a block diagram of a portable telephone, which is an application example using the multiprocessor system of the invention.

FIG. 9 is a block diagram showing a portable telephone using a multiprocessor system. This portable telephone uses the multiprocessor system described in the first exemplary embodiment.

In the drawing, the portable telephone 10 includes a communication unit 30 and an application unit 20. The communication unit 30 includes a communication processor (a transfer destination processor) 304, a RAM 305, and a communication system circuit that conducts a communication function by receiving the control of the communication processor 304 in accordance with a program in the RAM. The communication unit further includes a memory write control circuit 306, which has a DMA function for writing in the RAM 305 a program for the communication processor transferred from the application unit. These blocks are connected through a bus line. The application unit 20 includes an application processor (a transfer source processor) 201, a RAM 203, a ROM 202, a display unit 208, an operation unit 207, a telephone transmitter and a telephone receiver (not shown), and a peripheral circuit for controlling them. The application processor 201 is connected to the RAM 203 and the ROM 202 through a bus line. Further, the application unit 20 and the communication unit 30 are connected to each other through an interprocessor interface 107 so as to perform data communication.

The ROM 202 stores both programs for the application processor and the communication processor preliminary. The storage pattern thereof is the same as that of the ROM 102 used in the first exemplary embodiment. Accordingly, for the case of the ROM 202, a program for the communication processor is divided and stored in the area of the program for the processor B of FIG. 2. Each divided portion contains a header, and in the header, size information of the divided portion, a startup mode number, and the necessity of the transfer of data for the number are written.

The RAM 203 is a working memory of the application processor 201. The RAM 305 is a working memory of the communication processor 304 and is used as an area where a program for the communication processor 304 is expanded. The interprocessor interface circuit 107 is for performing data communication between the processors. Upon startup, the memory write control circuit 306 first receives transferred data (a code of a boot loader) from the application processor 201 through the interprocessor interface circuit 107 in accordance with signal control of the application processor 201, and then writes the received data in the RAM 305. While this, the communication processor 304 is maintained in a reset state in accordance with the signal control of the application processor 201. After the code transfer of the boot loader has been completed, the communication processor 304 starts executing the boot loader written in the RAM 305 in accordance with the control of the application processor 201. The boot loader hereafter performs reception of the program itself for the communication processor 304 from the application processor 201 and expansion processing of the same into the RAM 305. The application processor 201 judges from each header whether or not each divided code of the program in the ROM 202 for the communication processor corresponds to a designated startup mode, and then transfers only divided codes that correspond to the designated startup mode. Accordingly, only the divided code of the program for the communication processor that corresponds to the designated startup mode is transferred to the RAM 305. The program itself for the communication processor 304 for the designated startup mode may be transferred from the application processor 201 in the form of being compressed and/or encoded. In such a case, decoding processing is performed inside the boot loader before it is expanded into a prescribed program area of the RAM 305. When the transfer of the program itself for the communication processor 304 is completed, the communication processor 304 starts executing the program itself written in the RAM 305 in accordance with the control of the application processor 201.

When a designated startup mode is a single communication mode and it designates the mode that corresponds to a W-CDMA compliant communication system, the divided code that corresponds to the W-CDMA compliant communication system is transferred to the RAM 305. After completing the transfer, the communication processor starts operation of the corresponding mode. Namely, since it is not necessary to transfer a communication program which corresponds to other communication systems such as GSM, W-LAN and the like, the startup time of the portable terminal can be shortened.

The above mentioned portable telephone is an application example to which the multiprocessor system of the first exemplary embodiment is applied; however, the system of the second exemplary embodiment may be applied to as well. In such a case, similar to the portable telephone of the foregoing application example, a transfer destination processor and a transfer source processor are arranged in the communication unit and the application unit, respectively; the communication unit includes the communication system circuit which conducts the function thereof; and the application unit includes a display unit, an operation unit and the like.

The above exemplary embodiments and the application example are the multiprocessor systems using two processors; however, three or more processors can be used. In that case, as for the first and second exemplary embodiments, a plural number of transfer destination processors (the processor B) is prepared for a transfer source processor (the processor A) to be the multiprocessor system of the present invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2006-176430, filed on Jun. 27, 2006, the disclosure of which is incorporated herein in its entirety by reference.

BRIEF DESCRIPTION OF THE DRAWINGS

FIG. 4A shows a case with a normal mode, and FIG. 4B shows a case with a special mode.

REFERENCE NUMERALS

10 portable telephone
20 application unit
30 communication unit
100, 600 multiprocessor system
101, 601 transfer source processor (processor A)
102, 202, 602, ROM
103, 105, 203, 305, 603 RAM
104, 604 transfer destination processor (processor B)
106, 306 memory write control circuit
107 interprocessor interface circuit
201 application processor
304 communication processor
605 arbitration circuit

The invention claimed is:

1. A multiprocessor system, comprising:
a first processor that executes a first program;
a second processor that brings the first processor to a reset state and releases the first processor from the reset state, and executes a second program independently of the first processor;
a read-only memory for storing the first program and the second program;
a random access memory including a memory area in which the first program and the second program are expanded and stored; and
an arbitration circuit that allows the first processor and the second processor to access the random access memory, and adjusts and gives a bus citizenship between the processors,
wherein the random access memory includes a shared area which can be accessed by both of the processors, the shared area being used for interprocessor communication,
wherein the second processor directly expands the program for the first processor stored in the read-only memory into the memory area in the random access memory, and performs validity check of the expanded program, and
wherein the first processor is maintained in the reset state until the validity check of the program expanded by the second processor is completed, and, after the program is confirmed to have been expanded without problems, the first processor is released from the reset state by control of the second processor and starts executing the program expanded in the random access memory.

2. A transferring method in a multiprocessor system, comprising:
allowing a first processor and a second processor to access a random access memory, and adjusting a bus citizenship between the processors;
performing interprocessor communication using a shared area of the random access memory;
directly expanding, using the second processor, a program for the first processor stored in a read-only memory into a memory area in the random access memory, and performing validity check of the expanded program;
maintaining the first processor in a reset state until the validity check of the program expanded by the second processor is completed;
after the program is confirmed to have been expanded without problems, releasing the first processor from the reset slate by control of the second processor, and executing the program for the first processor expanded in the random access memory.

3. A portable terminal, comprising:
a read-only memory for storing a program executed by a first processor and a program executed by a second processor;
a random access memory including: a memory area in which the programs are expanded and stored, and a shared area that can be accessed by both of the processors, the shared area being used for interprocessor communication; and
an arbitration circuit which allows the first processor and the second processor to access the random access memory, and adjusts and gives a bus citizenship between the processors,
wherein the first processor is used as a processor for executing a communication program for portable terminals, the second processor is used as a processor for executing an application program for portable terminals, and the first processor and the second processor performs interprocessor communication by using the shared area in the random access memory,
wherein the second processor directly expands the communication program stored in the read-only memory into the memory area in the random access memory, and performs validity check of the expanded program, and
wherein the first processor is maintained in a reset state until the validity check of the program expanded by the second processor is completed, and, after the program is confirmed to have been expanded without problems, the first processor is released from the reset state by control of the second processor and starts executing the communication program expanded in the random access memory.

* * * * *